United States Patent
Wendte et al.

(10) Patent No.: US 9,043,950 B2
(45) Date of Patent: Jun. 2, 2015

(54) SEED DELIVERY SYSTEM

(71) Applicant: CNH America LLC, New Holland, PA (US)

(72) Inventors: Keith W. Wendte, Willowbrook, IL (US); Brian T. Adams, Centralia, MO (US)

(73) Assignee: CNH Industrial America LLC, New Holland, PA (US)

( * ) Notice: Subject to any disclaimer, the term of this patent is extended or adjusted under 35 U.S.C. 154(b) by 62 days.

(21) Appl. No.: 13/732,676

(22) Filed: Jan. 2, 2013

(65) Prior Publication Data
US 2014/0182495 A1 Jul. 3, 2014

(51) Int. Cl.
| A01C 7/04 | (2006.01) |
|---|---|
| A01C 7/10 | (2006.01) |
| A01C 7/20 | (2006.01) |
| A01C 7/08 | (2006.01) |

(52) U.S. Cl.
CPC .................. *A01C 7/102* (2013.01); *A01C 7/105* (2013.01); *A01C 7/082* (2013.01); *A01C 7/206* (2013.01); *A01C 7/046* (2013.01)

(58) Field of Classification Search
CPC ........ A01C 7/046; A01C 7/044; A01C 7/042; A01C 7/04; A01C 7/00; A01C 7/082; A01C 7/081; A01C 7/08; A01C 7/105; A01C 7/102; A01C 7/10; A01C 7/128; A01C 7/127; A01C 7/125; A01C 7/123; A01C 7/12; A01C 7/206; A01C 7/20; A01C 7/201; A01C 19/02; A01C 19/00

USPC ......... 111/170, 174–185, 200, 900, 902, 904, 111/921, 922, 903; 342/104, 61, 73, 89, 91, 342/92, 94, 99–103, 114, 115, 195; 701/50
See application file for complete search history.

(56) References Cited

U.S. PATENT DOCUMENTS

| 4,533,066 A | 8/1985 | Holmes et al. |
|---|---|---|
| 5,740,747 A | 4/1998 | Stufflebeam et al. |
| 6,081,224 A * | 6/2000 | Rosenbrock .................. 342/104 |
| 6,173,664 B1 | 1/2001 | Heimbuch |
| 6,247,417 B1 | 6/2001 | Heimbuch |
| 6,332,413 B1 | 12/2001 | Stufflebeam et al. |
| 6,477,967 B2 | 11/2002 | Rosenboom |
| 6,481,647 B1 | 11/2002 | Keaton et al. |
| 6,505,569 B1 | 1/2003 | Richard |
| 7,343,868 B2 | 3/2008 | Stephens et al. |
| 7,490,565 B2 | 2/2009 | Holly |
| 7,509,915 B2 | 3/2009 | Memory |
| 7,717,048 B2 | 5/2010 | Peterson et al. |
| 2010/0282147 A1 | 11/2010 | Wollenhaupt et al. |
| 2011/0232554 A1 | 9/2011 | Garner et al. |

* cited by examiner

*Primary Examiner* — Christopher J Novosad
(74) *Attorney, Agent, or Firm* — Rebecca L. Henkel (57) ABSTRACT

A seed delivery system is provided that includes a row crop seed planter having a seed meter that can pneumatically deliver seeds to the agricultural field at a rearward velocity that matches a forward velocity of the planter. The seed meter may include a positive pressure source that pressurizes the seed meter and creates an airflow out of a seed tube of the seed meter that carries the individual seeds out of the seed tube at a rearward velocity that is automatically adjusted to match a forward velocity of the seed planter and tractor.

13 Claims, 7 Drawing Sheets

SEED DELIVERY SYSTEM

FIELD OF THE INVENTION

The subject matter disclosed herein relates generally to row-crop planters or seeders and, in particular, to arrangements for controlling seed delivery velocity of seed meters.

BACKGROUND OF THE INVENTION

Modern farming practices strive to minimize operating expenses. One way of reducing operating expenses is to operate the farm equipment at relatively faster speeds, which reduces the amount of operating time to complete certain tasks. When operating equipment at faster speeds, it can be important to maintain the quality of operation that can be achieved while operating at relatively slower operating speeds. This can be especially difficult to accomplish during planting and seeding operations that require precise seed depth placement and spacing accuracy in order to maintain a good seed environment. Accordingly, seed meter functionality can be very important in modern farming practices to obtain profitability.

SUMMARY OF THE INVENTION

The present invention is directed to a seed delivery system that includes a planter having a seed meter that can pneumatically deliver seeds to the agricultural field at a rearward velocity that matches a forward velocity of the planter. This may minimize seed tumble of the seeds in the seed trench which may improve consistency of spacing distances between the seeds, which may improve yields.

According to one aspect of the invention, a seed delivery system is provided that includes a planter having a seed meter that may have a seed disk for individually conveying seeds through the seed meter for row crop planting of an agricultural field. A pressurized air inlet may deliver an airflow of positive pressure into the seed meter so as to pressurize at least a portion of the seed meter that is arranged on one side of the seed disk with a positive pressure. The pressurized air may be delivered through a dedicated airline from a blower to the pressurized air inlet or an airflow that delivers seed from a bulk fill hopper to the seed meter may be used to pressurize the seed meter. A seed cutoff location is arranged within the seed meter for releasing seeds from the seed disk. A seed tube is arranged downstream of the seed cutoff location and may include an inlet end having an inlet opening for receiving seeds that are released from the seed disk and an outlet end having an outlet opening for delivering the seeds to the agricultural field. A sensor may be arranged downstream of the seed cutoff location for determining a velocity of the seeds after the seeds are released from the seed disk. The sensor may be a flow sensor, such as a venturi-type flow sensor, a pilot tube-type flow sensor, and/or an anemometer, that can detect a velocity of an airflow through the seed tube. A pair of sensors, such as a pair of the seed sensors, may be arranged with respect to the seed tube for determining velocity of the seed being directed out of the seed tube. The sensor(s) may be arranged at a curved portion of an outlet end of the seed tube. The seed delivery system may determine the seed velocity using data from the sensor(s) and may adjust the positive pressure within the seed meter to increase or decrease the seed delivery of velocity to match for velocity of the planter. This may allow for delivery of seeds into the seed trench with substantially no horizontal velocity relative to the agricultural field.

According to another aspect of the invention, the seed tube may have longitudinally extending opening with a round cross-sectional perimeter shape and a relatively small inside diameter. A funnel may be arranged in an outlet segment of the seed meter which serves as a transition from the seed cutoff location to the relatively small diameter seed tube. The narrowing of the opening that extends through the funnel may provide a venturi-like effect through the funnel so as to increase the velocity of the air flowing through the funnel and the seed tube. This may help accelerate the individual seeds while the seeds are traveling through the funnel and the seed tube so as to increase the horizontal rearward velocity of the seeds at delivery to match the for velocity of the planter.

According to another aspect of the invention, the funnel may be defined in an insert that is arranged inside the outlet segment of the seed meter and the seed cutoff location may be provided within the funnel. A shoulder may be defined at an outlet end of the funnel and against which an inlet end of the seed tube abuts. An inner diameter of the outlet end of the funnel may be the same size or smaller than the inner diameter of an inlet end of the seed tube. This may allow for a smooth and low-friction transition, without obstruction, between the seed cutoff location and the seed tube, which may provide for consistent delivery velocities of the individual seeds.

According to another aspect of the invention, the curved portion of the seed tube is curved enough so that an exit opening of the seed tube faces a direction that may be only slightly angled with respect to the agricultural field. This may help convert a substantially vertically directed velocity component of the seed into a substantially horizontally directed velocity component of the seed at the time a delivery from the seed tube, which may help the seed the seed tube at a relatively high rearward horizontal velocity that may match a relatively high forward velocity of the planter so as to minimize an overall horizontal velocity of the seed relative to the agricultural field while using fast moving equipment.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

DETAILED DESCRIPTION

Figure 1:
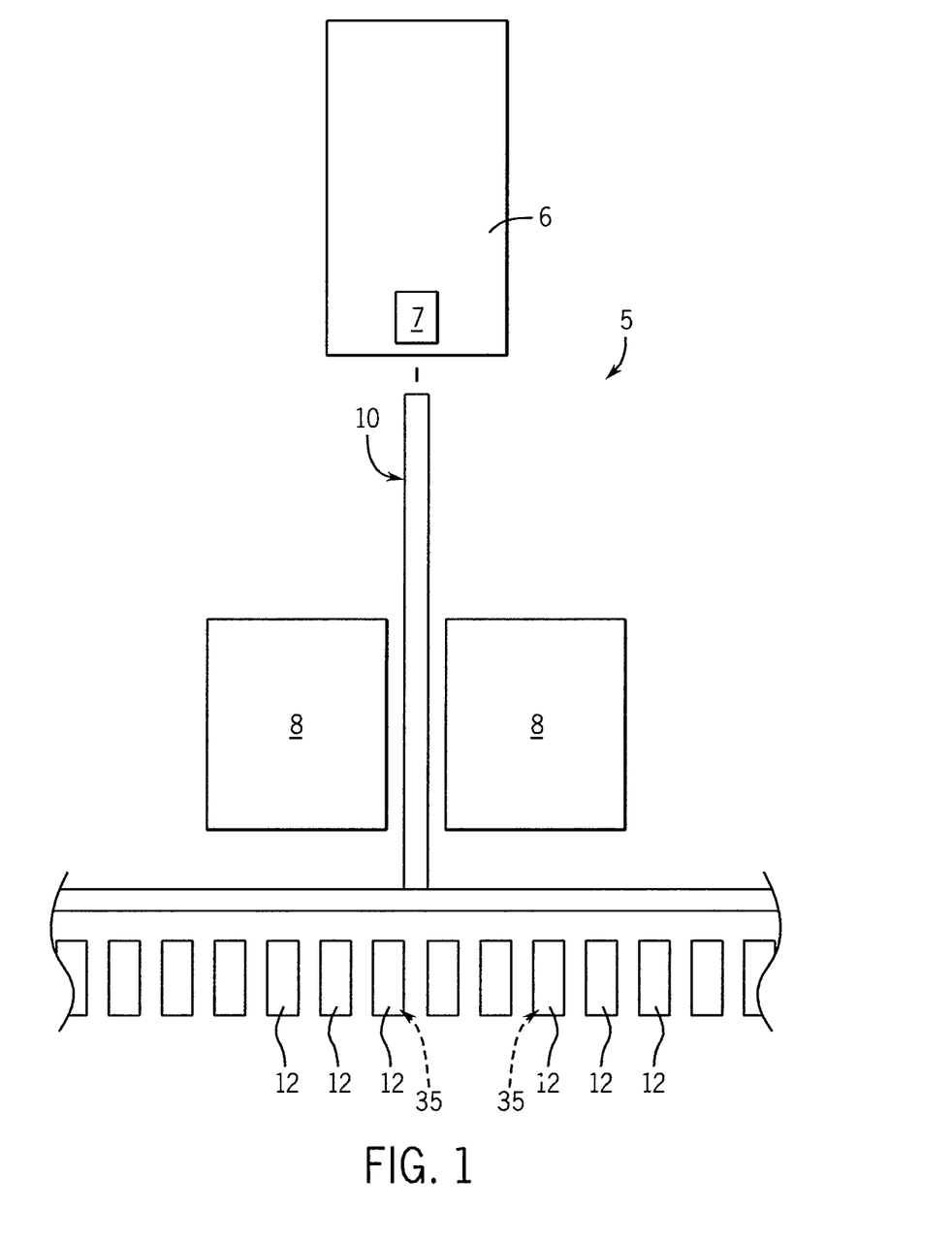
FIG. 1 is a schematic representation of a tractor pulling a seed planter that incorporates a seed delivery system in accordance with the present invention.

Referring now to the drawings and specifically to FIG. 1, a portion of a multiple row crop planter implement or seed planter 5 is schematically shown. The seed planter 5 may be one of the EARLY RISER® series planters available from Case IH and is typically pulled by a traction device such as a tractor 6 that includes a known speed sensor 7 for determining the travel speed of the tractor 6. In this embodiment, seed is held in bulk storage in primary seed hoppers 8 that are supported by a frame 10. The seeds are pneumatically, or otherwise, directed through a seed conduit (not shown) to various row planting units 12 that are also supported by the planter frame 10. The row planting units 12 are substantially identical and each can deliver seeds individually for row crop planting in an agricultural field, as is explained in greater detail elsewhere herein.

Figure 2:
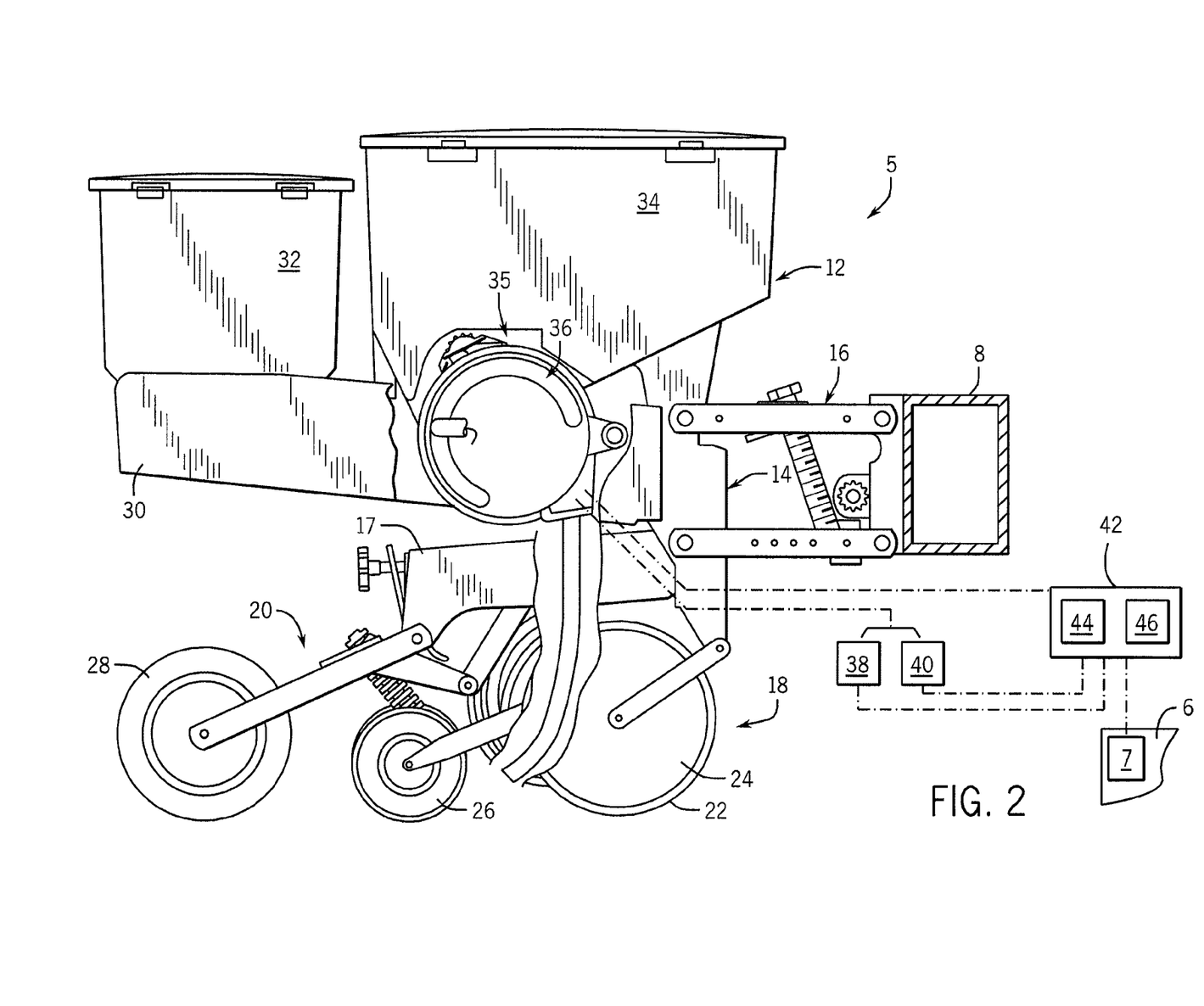
FIG. 2 is a side elevational view of a portion of a variant of the seed planter of FIG. 1 incorporating the seed delivery system of the present invention.

Referring now to FIG. 2, in this embodiment, the seeds are not held remotely for the row planting units 12 as was shown in FIG. 1. Instead the seed for each row planting unit 12 is held at each of the row planting units 12, only one of which is shown for simplicity. Each row planting unit 12 includes a sub-frame 14 that is connected to the frame 10 by way of a parallel linkage system 16. A lower portion of the sub-frame 14 supports a furrow opening mechanism 18 and a rearwardly extending bracket 17 upon which a furrow closing mechanism 20 is arranged behind the furrow opening mechanism 18. The furrow opening mechanism 18 includes an opener disk(s) 22 that penetrates the soil and creates a furrow and gauge wheel 24 that has a limited displacement relative to the opener disk(s) 22. This allows the depth of the furrow to be selected by an operator by adjusting the amount of permitted movement of the gauge wheel 24 so as to control the depth to which the opener disk(s) 22 can penetrate the soil. The furrow closing mechanism 20 includes a closing disk(s) 26 that closes the furrow after the row planting unit 12 deposits seeds into the furrow and a press wheel 28 that rolls over the closed furrow to firm the soil over the seed to further close the furrow and promote favorable seed to soil contact.

Still referring to FIG. 2, the sub-frame 14 includes a shelf 30 that is arranged above and generally parallel to the backbone 17. Shelf 30 is shown supporting an optional pesticide hopper 32 that contains, e.g., an herbicide or an insecticide, along with a known pesticide dispensing system (not shown) for applying controlled amounts of the contents in the desired location(s) while using the seed planter 5. Shelf 30 also supports a seed hopper 34 that holds the seed supply for planting by the row planting unit 10. Regardless of whether seeds are stored in seed hopper 34 (FIG. 2) or remotely in the bulk seed hoppers 8 (FIG. 1), the seeds are directed to a seed delivery system 35 that includes a seed meter 36. A vacuum source 38 and a positive pressure source 40 are operably connected to the seed meter 36 for establishing vacuum and positive pressures and corresponding air flows within the seed meter 36, as described in greater detail elsewhere herein. The vacuum and positive pressure sources 38, 40 include known pumps, fans, blowers, and/or other known system components. The positive pressure source 40 may be a stand-alone unit or may be the positive pressure system that pneumatically conveys seed from primary seed hoppers 8 to the individual row units for embodiments that use remote bulk storage tanks for seed storage.

Seed meter 36 is operably connected to a control system 42 that includes a controller 44 and power supply 46, as is known, for controlling the seed meter 36, the vacuum source 38, and the positive pressure source 40 based on at least on part on travel speed of the seed planter 5 which may correspond to the travel speed of the tractor 6 as determined by speed sensor 7. The controller 44 can include an industrial computer or, e.g., a programmable logic controller (PLC), along with corresponding software and suitable memory for storing such software and hardware including interconnecting conductors for power and signal transmission for controlling electronic or electro-mechanical components of the seed meter 36, which may include the vacuum and positive pressure sources 38, 40.

Figure 3:
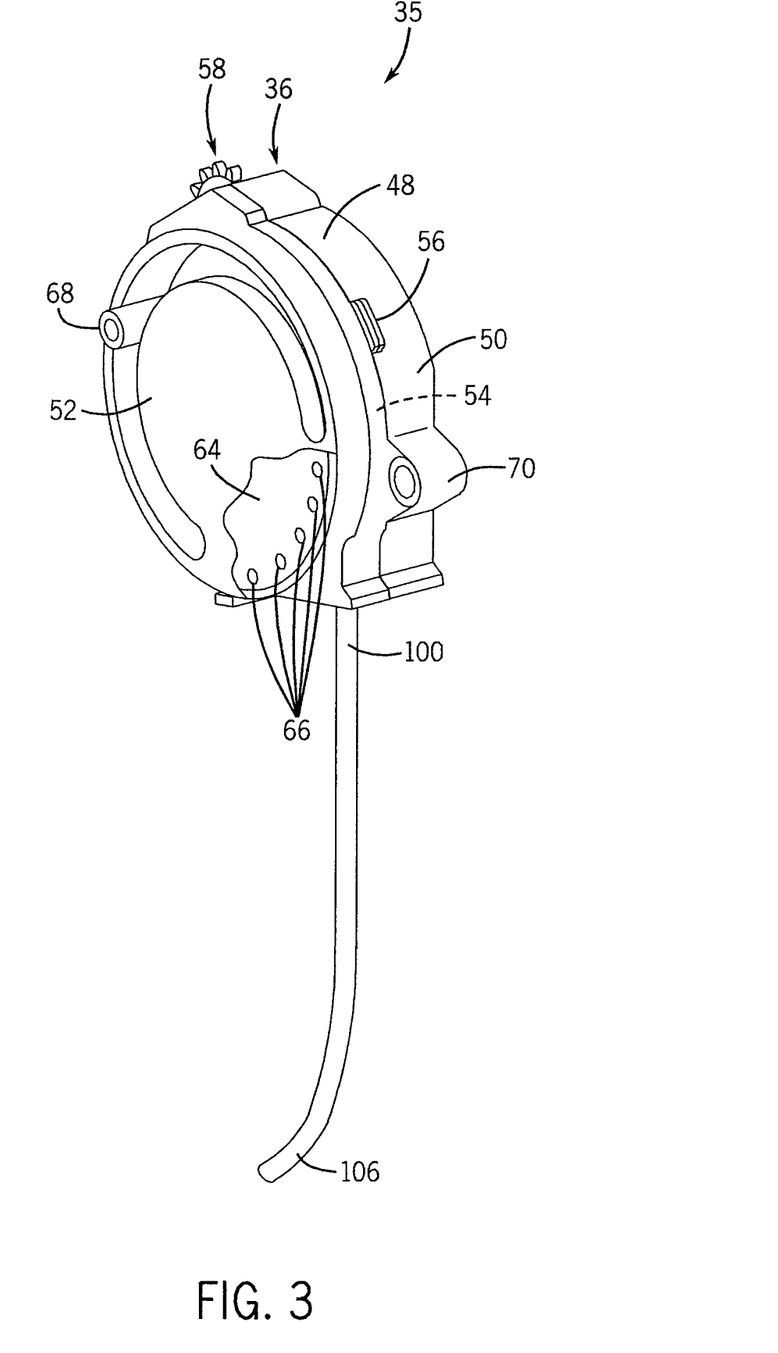
FIG. 3 is a simplified pictorial view of a seed meter used with the seed delivery system.
Figure 4:
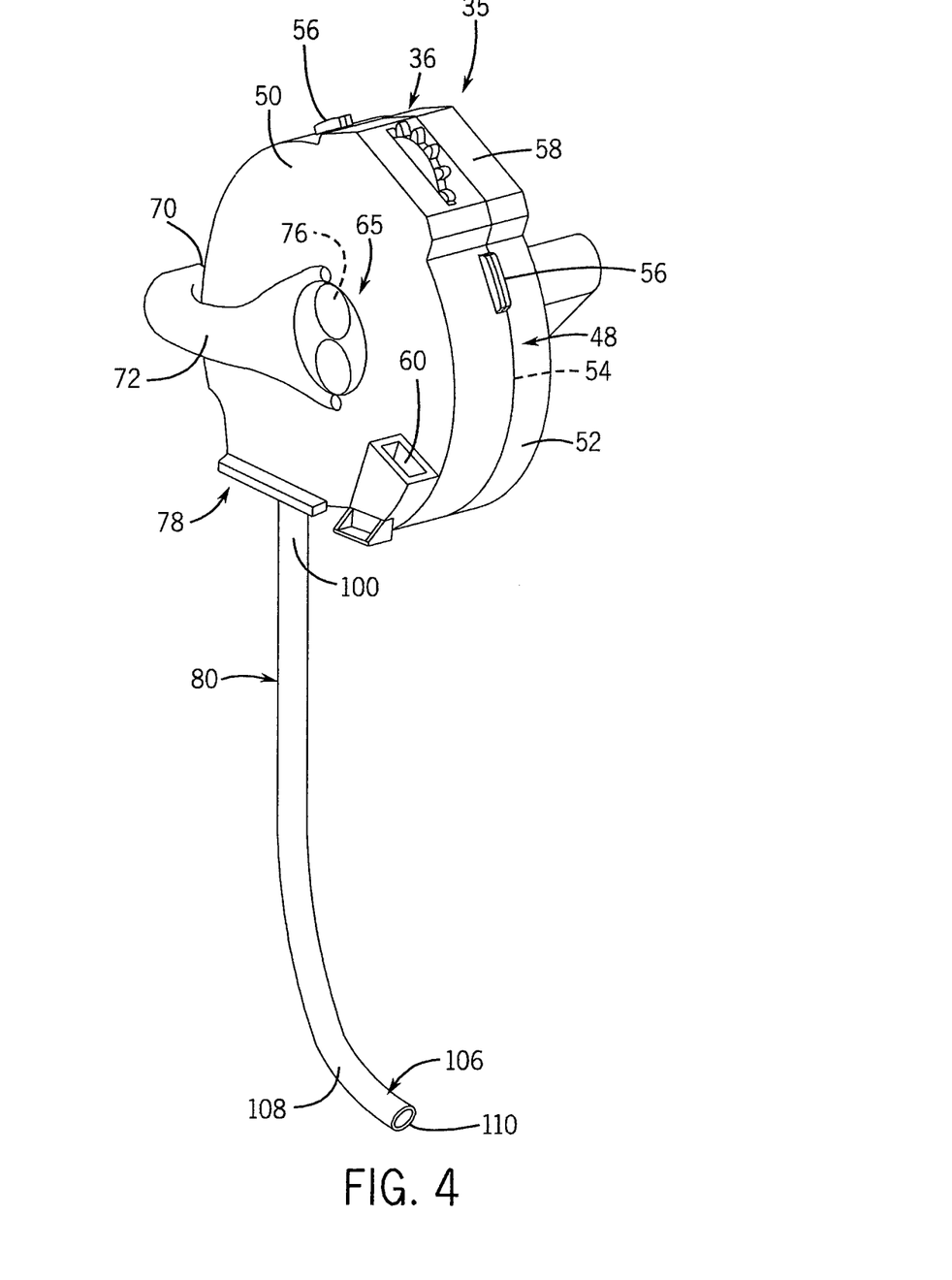
FIG. 4 is another simplified pictorial view of the seed meter used with a seed delivery system.

Referring now to FIGS. 3 and 4, the seed meter 36 includes a multi-component housing 48 that supports the entire seed meter 36 and its components and temporarily holds the seed that is being metered. The housing 48 includes a meter cover 50 and a seed disk cover 52 that engage each other at respective outer peripheries so as to define a cavity 54 inside of the housing 48. Latches 56 are shown as connecting the meter cover 50 and seed disk cover 52 to each other at spaced apart locations about the seed meter 36. A seed singulator 58 that is configured to inhibit more than one seed from being discharged from the seed meter 36 per seed discharge event is arranged on the housing 48. A seed opening 60 (FIG. 4) extends into the meter cover 50 and provides an entry through which the seeds enter the seed meter 36 so that the seeds can be held in an area of the meter housing cavity 54 that is confined by a divider wall 62 (FIG. 5) and a seed disk 64 (FIG. 3) that is rotatably arranged in the housing cavity 54. As shown in FIG. 4, a drive assembly 65 is mounted to the seed meter 36 for driving the rotating components of the seed meter 36. Drive assembly 65 may be operably connected to and controlled by the control system 42 (FIG. 2) and may include, for example, various electric or hydraulic motors, drive shafts, chains and belts, peg and hole drive systems, and/or other arrangements such as a directly driven arrangement in which a motor directly drives the seed disk 64 at its periphery, as is known.

Referring now to FIG. 3, as is known, seed disk 64 includes seed pockets 66 that are discrete openings that include holes that extend between front and back surfaces and thus through the entire thickness of the seed disk 64. The seed pockets 66 are spaced from each other and, in this embodiment, are arranged in a single circle-shaped pattern. In other embodiments of the seed disk 64 that are configured for planting relatively small seeds like soybeans and sorghum, relatively more seed pockets 66 are provided and are arranged in patterns of multiple concentric circles so that the seed pockets 66 occupy a relatively larger percentage of the surface area of the seed disk 64.

Still referring to FIG. 3, a vacuum inlet 68 and vacuum supply hose (not shown) connect the seed meter 36 to the vacuum source 38. The vacuum inlet 68 is arranged on the seed disk cover 52 for creating a vacuum pressure within a portion of the cavity 54 for holding seeds within the seed pockets 66 of the seed disk 64 while the seeds travel through the seed meter 36. A pressurized air inlet tube 70 and air supply hose (not shown) connect the seed meter 36 to the positive pressure source 40. The pressurized air inlet tube 70 is arranged on the meter cover 50 for creating a variable positive pressure within a portion of the cavity 54 and creating a variable speed airflow out of the seed meter 36, as is explained in greater detail elsewhere herein. In this way the vacuum and positive pressure sources 38, 40 may influence opposing sides of the seed disk 64 for helping move seeds through and release seeds out of the seed meter 36, respectively.

Figure 5:
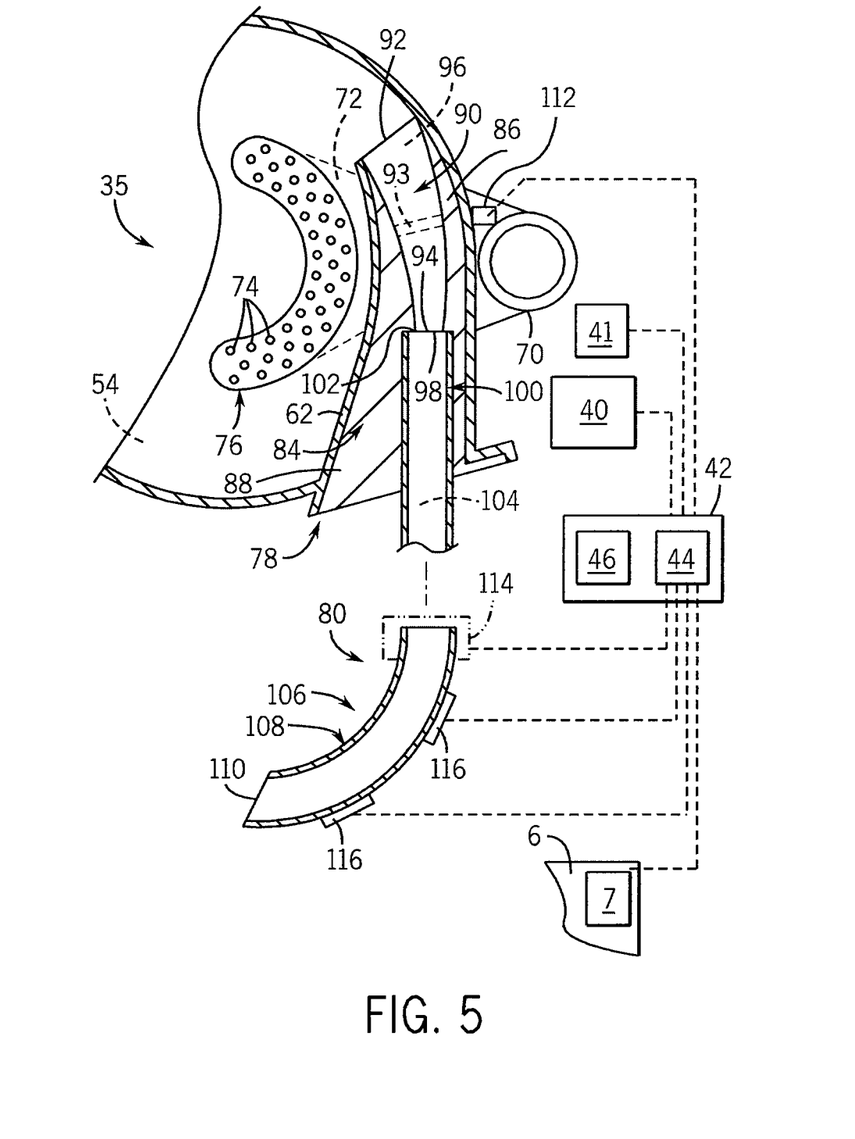
FIG. 5 is a simplified cross-sectional view of a portion of the seed meter and partially schematic view of other portions of the seed delivery system.

Referring now to FIGS. 4 and 5, a duct 72 extends from the pressurized air inlet tube 70 for delivering the airflow of positive pressure through the meter cover 50 by way of openings 74 of an air inlet 76. The seed meter 36 includes a seed outlet 78 for releasing seeds from the seed disk 64 (FIG. 3) and the delivery through the seed tube 80 to the agricultural field. A funnel 90 and a portion of the seed tube 80 that is inside of the seed outlet 78 is pressurized with the positive pressure source 40. This creates an airflow that accelerates the seeds through the funnel 90 and portion of the seed tube 80 that is inside of the outlet 78 to deliver the singulated seeds out of the seed tube 80 at a delivery velocity that corresponds to a travel velocity of the tractor 6 and seed planter 5. As shown in FIG. 5, an insert 84 is arranged within the seed outlet 78 of the seed meter 36. The insert 84 has opposing upper and lower ends 86, 88. The upper end 86 includes the funnel 90 that defines a funnel inlet 92 that receives seeds that are released from the seed disk 64 and a funnel outlet 94 that is smaller than the funnel inlet 92. The narrowing cross-sectional area of a longitudinally extending tapering bore 96 of the funnel 90 that extends between the funnel inlet and outlet 92, 94 may provide a venturi-like effect that increases the velocity of air that flows through the funnel 90. A cutoff location 93 is defined between the funnel inlet and outlet 92, 94. At the cutoff location 93 the vacuum pressure that holds the seeds against the seed disk 64 may be removed so that the seeds fall away from the seed disk 64, or the seeds may otherwise be removed from the seed disk 64 at the cutoff location 93.

Still referring to FIG. 5, the funnel outlet 94 directs the seeds from the funnel 90 into an inlet opening 98 that is defined at an inlet end 100 of the seed tube 80. In this embodiment, a shoulder 102 is defined at the funnel outlet 94 of the insert 84. The inlet end 100 of the seed tube 80 inserts into a lower border 104 of the insert 84 so that the inlet end 100 abuts the shoulder 102. In this way the funnel outlet 94 defines an opening that is smaller than the inlet opening 98 of the seed tube 80 so as to provide a smooth transition without any inwardly protruding structures between the funnel 90 and the seed tube 80 in the direction of flow.

Still referring to FIG. 5, in this embodiment, a longitudinally extending bore 104 of the seed tube 80 is round in cross-section and provides a relatively small inside diameter that is substantially constant along the entire length of the seed tube 80 between the inlet end 100 and an outlet end 106. The outlet end 106 of the seed tube 80 defines a curved portion 108 that changes direction of travel of seed traveling through the seed tube 80 from being generally vertical to generally horizontal, for example, being arranged at an angle of about 30° or less with respect to the underlying agricultural field, for delivering out of an outlet opening 110 at the outlet end 106 of the seed tube 80.

Still referring to FIG. 5, various sensors are arranged with respect to the seed meter 36 that cooperate with the control system 42 for controlling pressure within the seed meter 36 velocity of air flow out of the seed tube 80 for controlling delivery velocity of the seed onto the agricultural field. A pressure sensor 112 is arranged with respect to the seed meter 36 for detecting an amount of pressure within the seed meter 36 that produces the airflow which accelerates seed out of the seed tube 80. In this embodiment, the pressure sensor 112 is mounted to the duct 72. Pressure values sensed by the pressure sensor 112 may correspond to airflow velocity values and thus seed delivery velocities out of the seed tube 80 or such values may be determined in a relatively more direct way. A flow sensor 114 may directly or indirectly sense the velocity of the airflow that carries the seed out of the delivery tube 80. Flow sensor 114 is schematically shown arranged at the outlet end 106 of the seed tube 80. The flow sensor 114 may be a venturi-type flow sensor, a pilot tube-type flow sensor, and/or an anemometer that can detect a velocity of the airflow through the seed tube 80 for determining the seed delivery velocity. The seed delivery velocity may also be determined by a pair of seed sensors 116 that are spaced from each other and provided upon the seed tube 80. The seed sensors 116 are arranged to detect each seed as it passes through the delivery tube 80. In this way, the velocity of the seed can be calculated by the control system 42 by dividing the fixed distance between the seed sensors 116 by the time that it takes the seed to travel from the first sensor to the second sensor.

Figure 6:
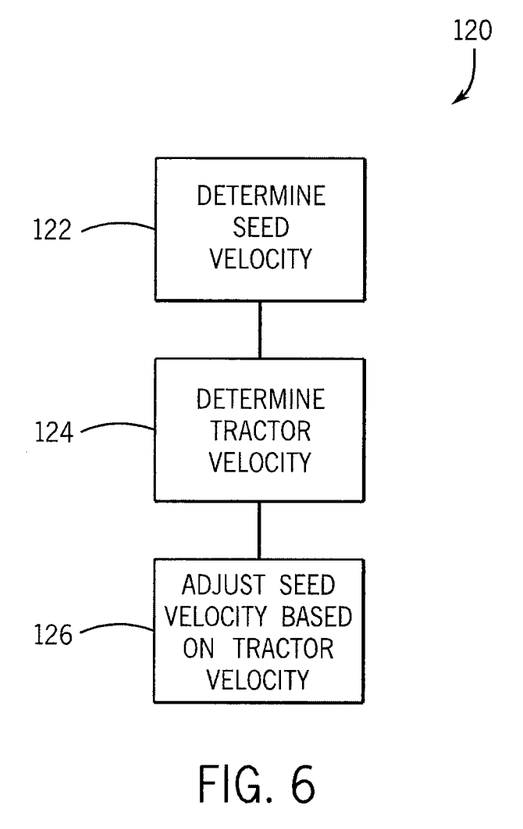
FIG. 6 is a flowchart of a use procedure of the seed delivery system.

Referring now to FIGS. 5 and 6, the seed meter 36 may be controlled in generally the following way to automatically adjust the seed delivery velocity to match the travel speed of the seed planter five so as to provide a seed horizontal velocity of zero mph relative to the agricultural field, as represented by procedure 120 and referring to the components of FIG. 5. Control system 42 determines the seed delivery velocity, as represented at block 122. This may be done by evaluating a rate at which each seed travels past the seed sensors 116, or by way of airflow velocity detected by flow sensor 114, optionally by a value of a pressure within the seed meter 36 as determined by pressure sensor 112. Control system 42 determines a travel velocity of the seed planter 5 which may be done by determining the travel velocity of the tractor 6 by way of speed sensor 7, as represented at block 124. The control system 42 compares the value of the tractor 6 and seed planter 5 travel velocity with the seed delivery velocity. Control system 42 controls the positive pressure source 40 so as to negate any difference between the tractor and seed planter travel velocity and the seed delivery velocity so as to provide a horizontal seed delivery velocity of zero mph relative to the agricultural field, as represented at block 126. The control of the positive pressure source 40 to adjust pressure within the seed meter 36 and the velocity of the airflow through the seed tube 80 may be done by varying the rate of a fan or pump of the positive pressure source 40, optionally varying a position of a control valve 41 so as to deliver the airflow at a different mass flow rate into and through the seed meter 36. In one embodiment, a speed sensor is arranged at each seed meter 36 for determining individual travel velocities of the individual seed meters 36 so as to separately control discharge velocities of the individual seed meters 36 while turning. This allows for increasing the seed discharge velocities at outwardly disposed seed meters 36 relative to the turn while turning more than the seed discharge velocities at inwardly disposed seed meters 36 that are nearer to the inside of the turn.

Figure 7:
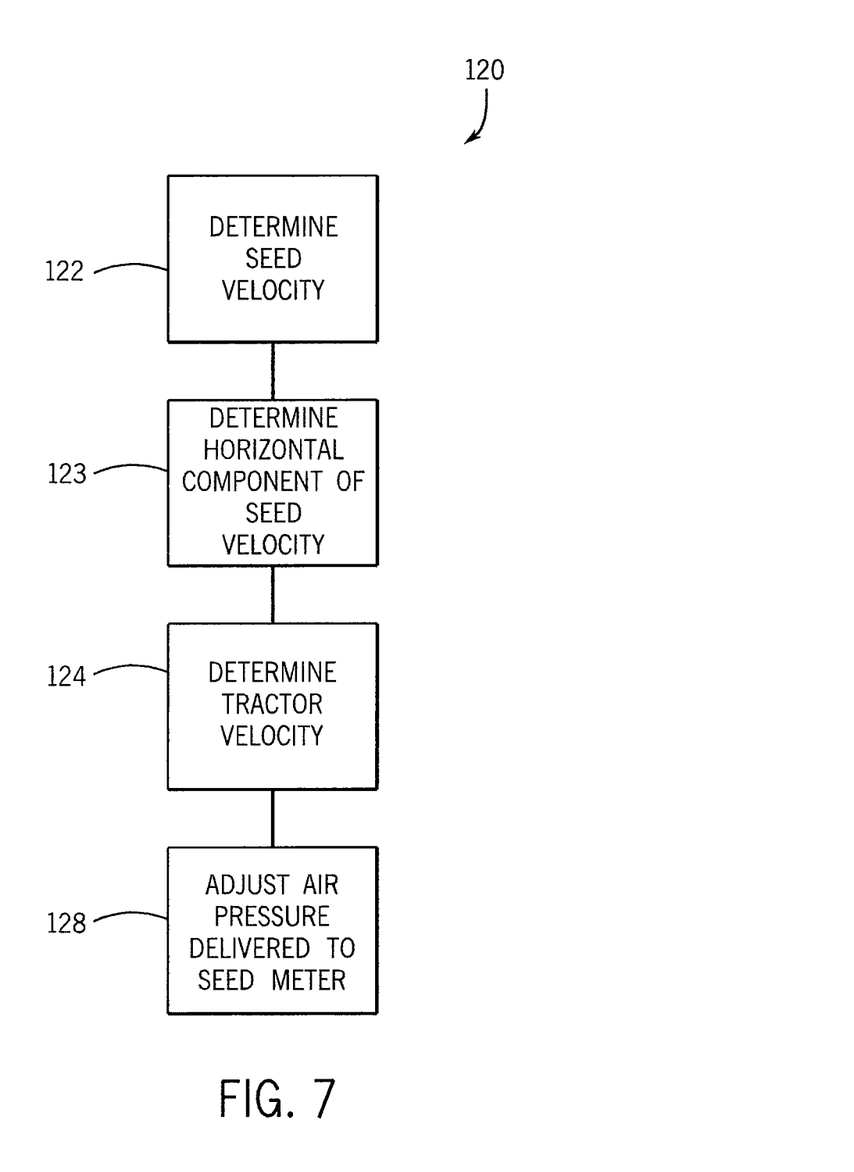
FIG. 7 is a flowchart of a variant of the procedure of FIG. 6.

Referring now to FIGS. 5 and 7, this procedure at 120 is substantially the same as that shown in FIG. 6. As represented at block 123, the control system 42 determines the horizontally directed vector component in a rearward direction of the seed delivery velocity. At block 128, the control system may adjust pressure within the seed meter 36 as monitored by pressure sensor 112 until the rearward horizontal velocity of the seed matches the forward velocity of the tractor 6 and seed planter 5 so that the net horizontal velocity of the seed is zero mph with respect to the agricultural field. In some embodiments, as the positive pressure within the seed meter 36 is increased, the vacuum pressure within the seed meter 36 may be decreased. When the positive pressure source 40 delivers a sufficiently high positive pressure airflow through the seed meter 36 such positive pressure alone may be sufficient for holding the individual seeds in the seed pockets 66 of the seed disk 64, whereby the vacuum source 38 may be turned off.

Many changes and modifications could be made to the invention without departing from the spirit thereof. The scope of these changes will become apparent from the appended claims.

We claim:

1. A method of row-crop planting with a seed delivery system that includes a planter having a seed meter, the method comprising:

individually conveying seeds through a seed meter with a seed disk for row-crop planting of an agricultural field;

delivering pressurized air to a housing of the seed meter so as to pressurize at least a portion of the seed meter that is arranged on one side of the seed disk with a positive pressure;

directing the seeds through a seed tube for delivery to the agricultural field;

providing a sensor in communication with the seed tube, the sensor generating signals corresponding to a rate at which the seeds travel through the seed tube;

determining a velocity of the seeds traveling through the seed tube in response to the signals generated by the sensor;

determining a velocity of the seed tube relative to the agricultural field; and adjusting a value of the positive pressure within the housing of the seed meter based at least in part on the velocity of the seed tube relative to the agricultural field and the velocity of the seeds traveling through the seed tube.

2. The method of claim 1 wherein the velocity of the seed tube relative to the agricultural field corresponds to a travel velocity of a tractor that is pulling the planter and wherein the velocity of the seed tube relative to the agricultural field is determined by determining the travel velocity of the tractor.

3. The method of claim 2 further comprising varying the travel velocity of the tractor and correspondingly varying the velocity of the seed traveling through the seed tube.

4. The method of claim 1 further comprising determining a horizontal velocity component of the individual seed traveling to the seed tube.

5. The method of claim 1 further comprising increasing the velocity of the seed while the seed is traveling through the seed tube.

6. The method of claim 5 wherein the seed accelerates through the seed tube at a rate that is greater than an acceleration due to gravity.

7. The method of claim 1 wherein the sensor monitors a velocity of air flowing through the seed tube, the velocity of air flowing through the seed tube corresponding to the rate at which the seeds travel through the seed tube.

8. A method of row-crop planting with a seed delivery system that includes a planter having a seed meter, the method comprising:

pulling a planter through an agricultural field with a tractor that is traveling at a travel velocity;

conveying individual seeds through a seed meter of the planter with a seed disk;

delivering pressurized air to a housing of the seed meter so as to pressurize at least a portion of the seed meter that is arranged on one side of the seed disk with a positive pressure;

directing the individual seeds through a seed tube for delivery to the agricultural field;

providing a sensor mechanism in communication with the seed tube, the sensor mechanism generating signals corresponding to a rate at which the seeds travel through the seed tube:

determining a rearward horizontal velocity of individual seeds traveling through the seed tube in response to the signals generated by the sensor mechanism;

determining the travel velocity of the tractor; and adjusting a value of the positive pressure within the housing of the seed meter so that the rearward horizontal velocity of the individual seeds approximates the travel velocity of the tractor.

9. The method of claim 8 further comprising varying the travel velocity of the tractor and varying the pressure within the seed meter so as to vary the velocity of the seed traveling through the seed tube.

10. The method of claim 9 further comprising pneumatically delivering seed in an airflow from a bulk fill hopper to the seed meter and pressurizing the seed meter with the airflow.

11. The method of claim 9 further comprising pneumatically delivering seed in a first airflow from a bulk fill hopper to the seed meter and the delivering a second airflow to the seed meter for pressurizing the seed meter.

12. The method of claim 9 wherein the sensor mechanism includes a pair of spaced apart seed sensors to determine the rearward horizontal velocity of individual seeds traveling through the seed tube.

13. The method of claim 9 wherein the sensor mechanism monitors a flow rate of an airflow through the seed tube for determining the rearward horizontal velocity of individual seeds traveling through the seed tube.

* * * * *